United States Patent [19]

Weber et al.

[11] Patent Number: 5,286,410

[45] Date of Patent: Feb. 15, 1994

[54] SUPERTWIST LIQUID-CRYSTAL DISPLAY

[75] Inventors: Georg Weber, Erzhausen; Reinhard Hittich, Modautal, both of Fed. Rep. of Germany

[73] Assignee: Merck Patent Gesellschaft Mit Beschrankter Haftung, Darmstadt, Fed. Rep. of Germany

[21] Appl. No.: 951,367

[22] Filed: Sep. 25, 1992

Related U.S. Application Data

[63] Continuation of Ser. No. 360,920, filed as PCT/EP89/00189, Feb. 28, 1989, published as WO89/08692, Sep. 21, 1989, abandoned.

Foreign Application Priority Data

Mar. 10, 1988 [DE] Fed. Rep. of Germany ....... 3807958

[51] Int. Cl.$^5$ .................... C09K 19/34; C09K 19/30; C09K 19/52; C09K 19/20
[52] U.S. Cl. .................. 252/299.61; 252/299.63; 252/299.01; 252/299.67; 359/75; 359/76; 359/106
[58] Field of Search ...................... 252/299.01, 299.63, 252/299.61, 299.65, 299.66, 299.67; 359/75, 76, 106

[56] References Cited

U.S. PATENT DOCUMENTS

| | | | |
|---|---|---|---|
| 4,818,428 | 4/1989 | Scheuble et al. | 252/299.63 |
| 4,822,519 | 4/1989 | Saito et al. | 252/299.63 |
| 4,846,999 | 7/1989 | Kizaki | 252/299.63 |
| 4,877,547 | 10/1989 | Weber et al. | 252/299.61 |
| 4,877,549 | 10/1989 | Sawada et al. | 252/299.63 |
| 4,913,532 | 4/1990 | Yoshida et al. | 252/299.01 |
| 4,917,819 | 4/1990 | Goto et al. | 252/299.63 |
| 4,923,632 | 5/1990 | Sawada et al. | 252/299.61 |

FOREIGN PATENT DOCUMENTS 234892 9/1987 European Pat. Off.

*Primary Examiner*—Philip Tucker
*Attorney, Agent, or Firm*—Millen, White, Zelano, & Branigan

[57] ABSTRACT

Supertwist liquid-crystal displays having excellent characteristic line steepness are obtained if the nematic liquid-crystal mixture satisfies the following conditions:
  a nematic phase range of at least 60° C.,
  a viscosity of 30 mPa.s or less,
  $\Delta\epsilon/\epsilon_\perp < 1.5$, where $\Delta\epsilon$ denotes the dielectric anisotropy and $\epsilon_\perp$ denotes the dielectric constant in the direction of the short axis of the liquid-crystal molecules, and
  $\Delta\epsilon$ is greater than or equal to +5,
and is based on the following components:
  a) compounds having a high $\epsilon_\perp$ and a clearly positive dielectric constant, selected from the group comprising the formulae 1–8:

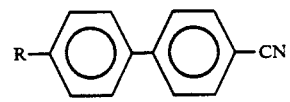

1

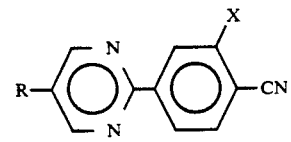

2

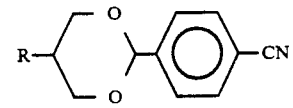

3

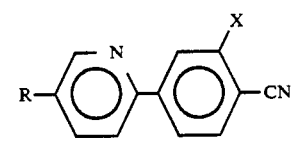

4

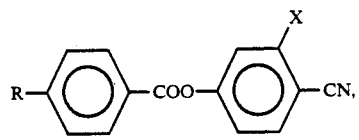

5

-continued
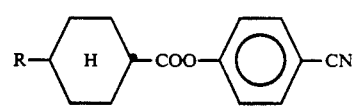
6
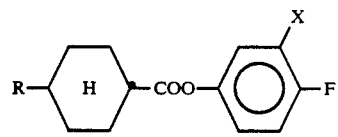
7
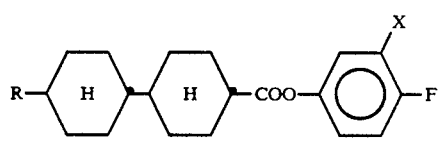
8
and/or compounds of the formula A and/or B
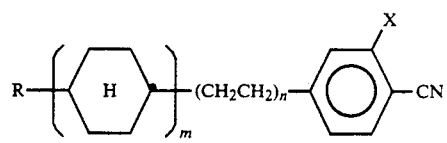
A
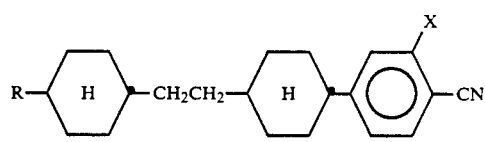
B
and, if appropriate, compounds selected from the group comprising the formulae 9 to 11
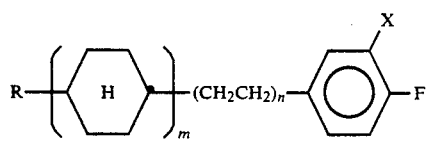
9
-continued
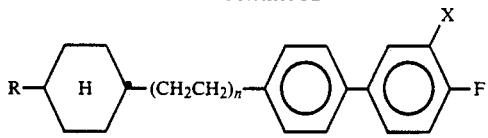
10
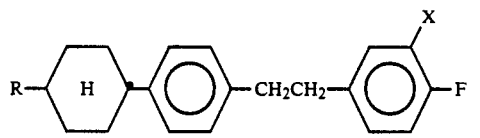
11
and
b) relatively non-polar compounds having a large $\epsilon\perp$, selected from the group comprising the formulae 12 to 18:
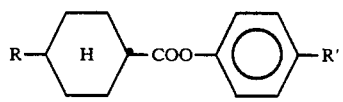
12
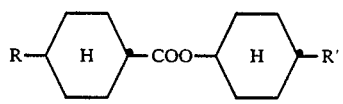
13
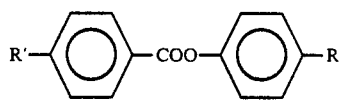
14
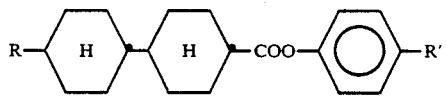
15
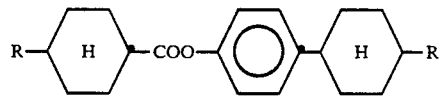
16

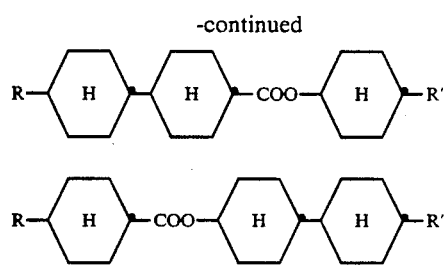

17

18 and/or compounds from the group comprising the formulae C and D

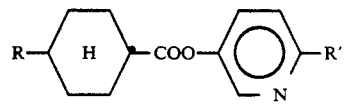

C

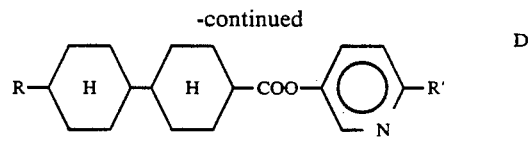

D and, if appropriate, compounds having a high birefringence, from the group comprising the formulae 19 and 20:

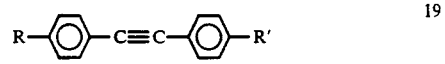

19

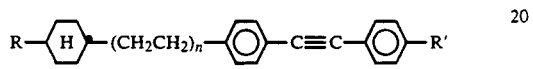

20 where X is H or F, m is 1 or 2, n is 0 or 1, and R is in each case alkyl, oxaalkyl or alkenyl having 2 to 7 C atoms, each of which is straight-chain, and R' is alkyl or alkoxy, each of which has 1 to 7 C atoms and each of which is straight-chain.

4 Claims, No Drawings

SUPERTWIST LIQUID-CRYSTAL DISPLAY

This application is a continuation of application Ser. No. 07/360,920, filed May 30, 1989, now abandoned.

The invention relates to a supertwist liquid-crystal display having two planoparallel support plates which, together with a border, form a cell, a nematic liquid-crystal mixture which is located in the cell, has positive dielectric anisotropy and has at least one chiral dope, electrode layers with overlying orientation layers on the insides of the support plates, a tilt angle between the longitudinal axis of the molecules at the surface of the support plates and the support plates of from about 1 degree to 30 degrees, and a twist angle of the liquid-crystal mixture in the cell of between 160° and 360° from orientation layer to orientation layer, characterized in that the nematic liquid-crystal mixture satisfies the following conditions:

a nematic phase range of at least 60° C., a viscosity of 30 mPa.s or less, $\Delta\epsilon/\epsilon\perp < 1.5$, where $\Delta\epsilon$ denotes the dielectric anisotropy and $\epsilon\perp$ denotes the dielectric constant in the direction of the short axis of the liquid-crystal molecules, and $\Delta\epsilon$ is greater than or equal to $+5$, and is based on the following components:

a) compounds having a high $\epsilon\perp$ and a clearly positive dielectric constant, selected from the group comprising the formulae 1-8:

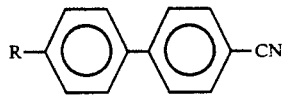

1

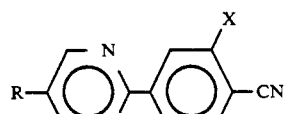

2

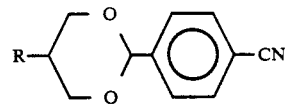

3

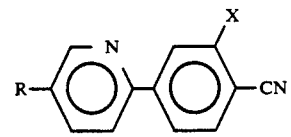

4

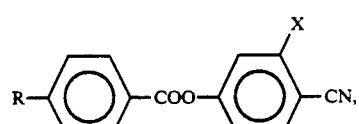

5

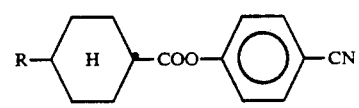

6

-continued

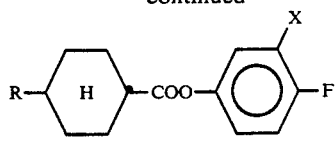

7

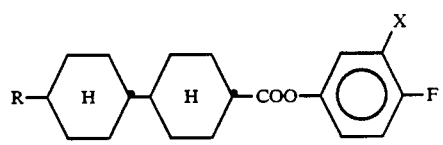

8 and/or compounds of the formula A and/or B

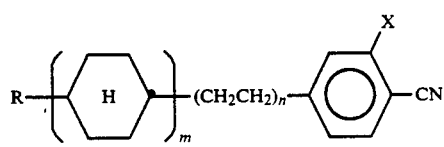

A

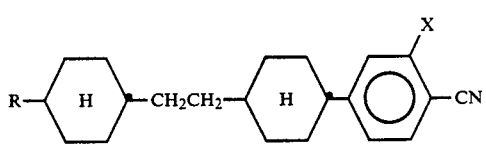

B and, if appropriate, compounds selected from the group comprising the formulae 9 to 11

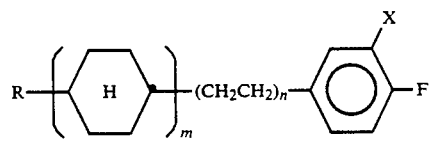

9

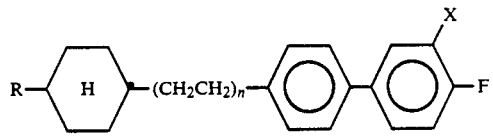

10

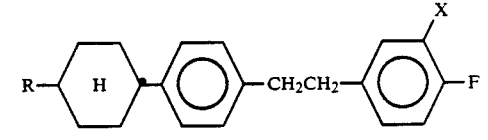

11 and b) relatively non-polar compounds having a large $\epsilon\perp$, selected from the group comprising the formulae 12 to 18:

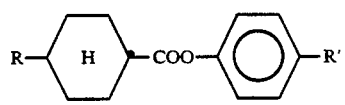

12

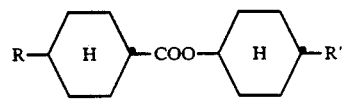

13

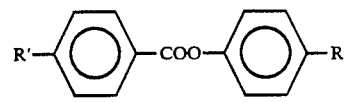

14

-continued

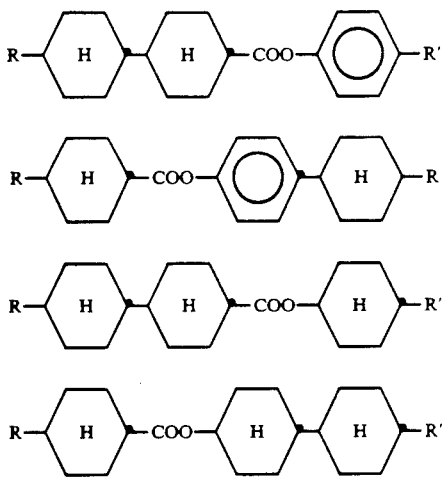

and/or compounds from the group comprising the formulae C and D

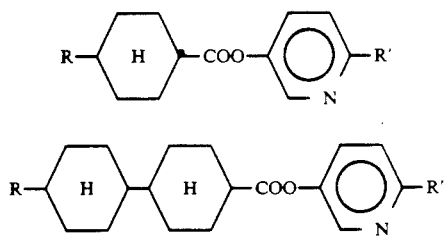

and, if appropriate, compounds having a high birefringence, from the group comprising the formulae 19 and 20:

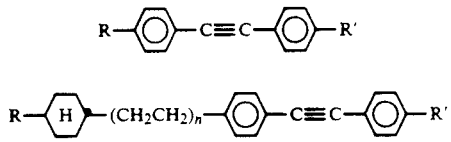

where X is H or F, m is 1 or 2, n is 0 or 1, and R is in each case alkyl, oxaalkyl or alkenyl having 2 to 7 C atoms, each of which is straight-chain, and R' is alkyl or alkoxy, each of which has 1 to 7 C atoms and each of which is straight-chain.

Supertwist liquid-crystal displays (SLC displays) according to the precharacterizing clause are known, for example from EP 0,131,216 B1; DE 3,423,993 A1; EP 0,098,070 A2; M. Schadt and F. Leenhouts, 17. Freiburger Arbeitstagung Flüssigkristalle [17th Freiburg Congress on Liquid Crystals) (8-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1-8 (1986). Here, the term SLC displays covers displays having a high degree of twist, with a value for the twist angle of between 160° and 360°, such as, for example, the displays according to Waters et al. (C. M. Waters et al., Proc. Soc. Inf. Disp. (New York) (1985) (3rd Intern. Display Conference, Kobe, Japan), the STN-LCDs (DE OS 3,503,259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP OS 0,246,842 ) or BW-STN-LCDs (K. Kawasaki et al., SID 87 Digest 391 (20.6)).

Compared with standard TN displays, displays of this type are distinguished by a considerably better steepness of the electrooptical characteristic line and accordingly better contrast values, and by a significantly lower angle dependency of the contrast. Of particular interest are supertwist displays having a very high characteristic line steepness. In general, the $V_{50}/V_{10}$ ratio is chosen as a measure of the characteristic line steepness ($V_{50}$=voltage at 50% contrast/$V_{10}$=voltage at 10% contrast). In order to achieve a high characteristic line steepness, the elastic properties, in particular, of the liquid-crystal mixture have hitherto been optimized. However, the steepnesses achieved were not adequate for all applications.

There is thus still a great demand for SLC displays having a very high characteristic line steepness and at the same time a large operating temperature range, short switching times and a low threshold voltage.

The invention has the object of providing SLC displays which do not have the abovementioned disadvantages, or only to a small extent, and at the same time have a very high characteristic line steepness.

It has now been found that this object can be achieved if nematic liquid-crystal mixtures which satisfy the following conditions are used in these displays:

a nematic phase range of at least 60° C., a viscosity of 30 mPa.s or less, $\Delta\epsilon/\epsilon$ ... (sic)<1.5, where $\Delta\epsilon$ denotes the dielectric anisotropy and $\epsilon$ ... (sic) denotes the dielectric constant in the direction of the short axis of the liquid-crystal molecules, and $\Delta\epsilon$ is greater than or equal to +5, and is based on the following components:

a) compounds having a high $\epsilon\perp$ and a clearly positive dielectric constant, selected from the group comprising the formulae 1-8:

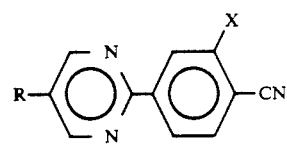

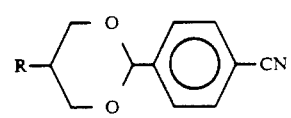

-continued

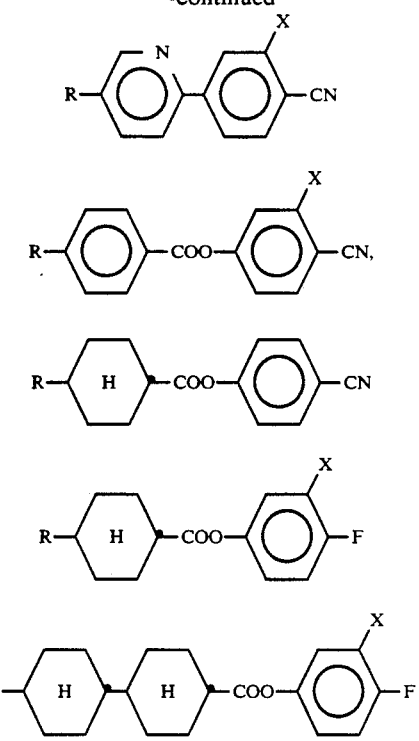

and/or compounds of the formula A and/or B

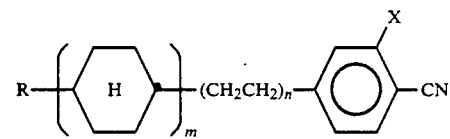

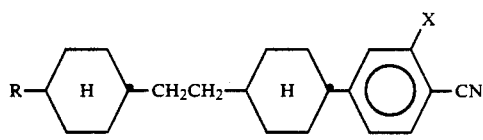

and, if appropriate, compounds selected from the group comprising the formulae 9 to 11

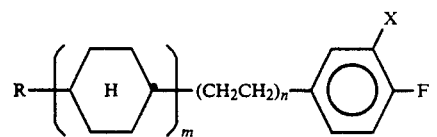

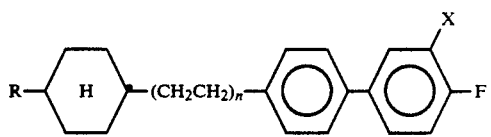

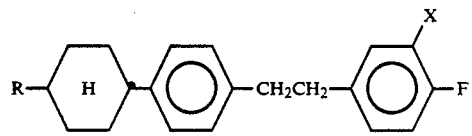

and b) relatively non-polar compounds having a large $\epsilon\perp$, selected from the group comprising the formulae 12 to 18:

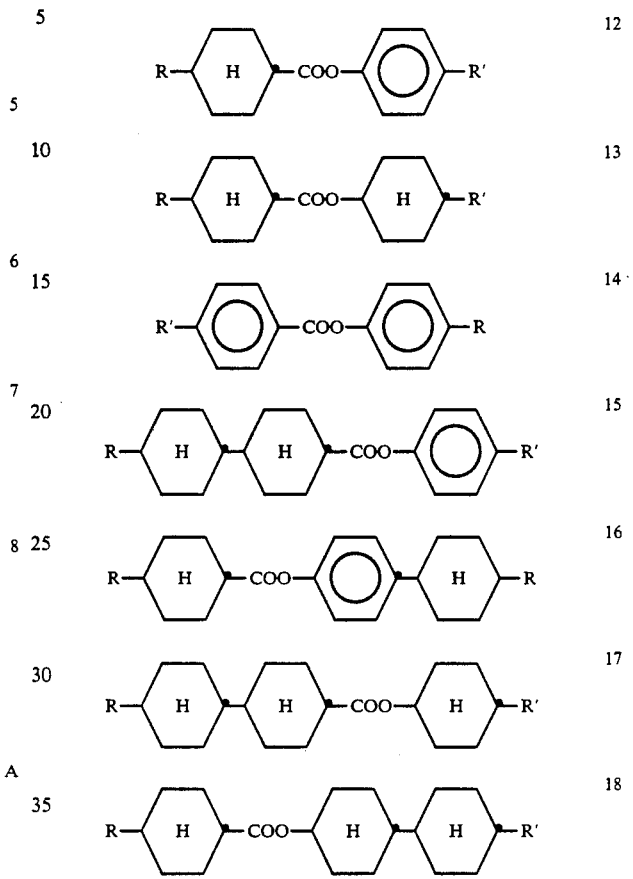

and/or compounds from the group comprising the formulae C and D

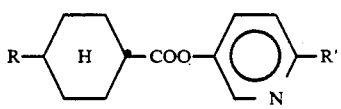

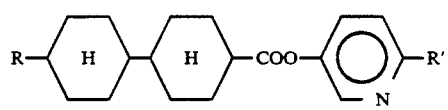

and, if appropriate, compounds having a high birefringence from the group comprising the formulae 19 and 20:

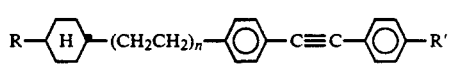

where X is H or F, m is 1 or 2, n is 0 or 1, and R is in each case alkyl, oxaalkyl or alkenyl having 2 to 7 C atoms, each of which is straight-chain, and R' is alkyl or alkoxy, each of which has 1 to 7 C atoms and each of which is straight-chain.

The invention thus relates to a corresponding supertwist liquid-crystal display.

The invention furthermore relates to corresponding display elements which satisfy the following conditions:
the product of the birefringence Δn and the layer thickness of the liquid-crystal mixture is between 0.1 μm and 2.5 μm
dielectric constant $\epsilon\perp$ greater than or equal to 4.

The invention furthermore relates to the use of corresponding liquid-crystal mixtures as dielectrics of corresponding displays.

Finally, the invention also relates to corresponding liquid-crystal mixtures for use in SLC displays.

Nematic liquid-crystal mixtures which satisfy two of the three conditions indicated are known and are utilized commercially in a wide variety of embodiments. It is furthermore known that Δε/ε⊥ values <1.5 can be achieved by using high proportions of phenyl benzoates corresponding to German Patent 2,167,252 or using liquid-crystals with a large negative dielectric constant (for example corresponding to German Offenlegungsschrift 3,231,707). However, these liquid-crystal mixtures are distinguished by high viscosity, the values often being between 40 and 50 mPa.s or higher at 20°. Corresponding SLC displays thus have switching times which are considerably too long for commercial application.

However, the liquid-crystal mixtures according to the invention make it possible to achieve a low value for Δε/ε⊥ at the same time as low viscosities, which means that excellent steepnesses of the electrooptical characteristic line can be achieved in SLC displays. The liquid-crystal mixtures according to the invention preferably have an ε⊥≧4, in particular an ε⊥≧6. Δε/ε is preferably ≦1.3, in particular ≦1.1. The viscosity at 20° C. is preferably ≦25 mPa.s. The nematic phase region is preferably at least 70, in particular at least 80°. This region preferably extends at least from −20° to +70°.

The individual compounds of the formulae 1 to 20 and A to D, and other compounds which can be used in the SLC displays according to the invention, are either known or can be prepared analogously to known compounds.

Preferred liquid-crystal mixtures which can be used according to the invention preferably contain a total of 40-100%, in particular 75-100%, of compounds of the formula (sic) 1 to 20 and A to D. They preferably contain a total of 10-30, in particular 12-20, components. Particularly preferred liquid-crystal mixtures are those which contain at least one component of the formulae 7, 8, 9, 10 and/or 11. Furthermore, preferred mixtures are those which contain at least one tolan compound of the formula 19 and/or 20.

The mixtures according to the invention preferably contain 10-30%, in particular 15-25%, of compounds selected from the group comprising the formulae 1-6. X is preferably fluorine. Compounds of the formulae 1, 2, 3 and 5 are particularly preferred. In a particularly preferred embodiment, compounds of the formulae 1 and 2, 1 and 3, 1 and 5, 2 and 3, 2 and 5 or 1 and 4 are present simultaneously.

The compounds of the formula A include those of the following sub-formulae

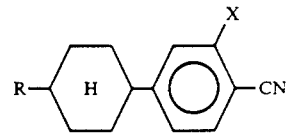
A1

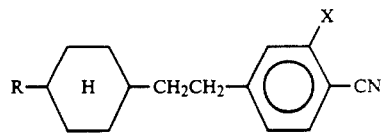
A2

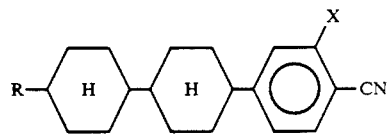
A3

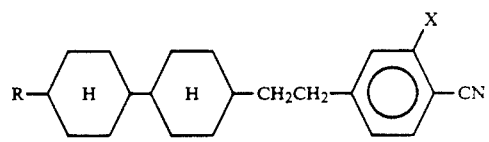
A4

Of these, those of the formulae A1 and A2 (X=preferably H) and A3 and A4 (X=preferably F) are preferred. The mixtures preferably contain one or more compounds of the formulae A and/or B in which X is fluorine.

If the group of compounds having a clearly positive dielectric constant is based predominantly on compounds of the formula A and/or B in the mixtures according to the invention, the mixtures preferably contain one or more compounds of the formulae 1-6 and/or 5-25% of one or more fluorine compounds of the formulae 7, 8, 9, 10 or 11. This applies, in particular, when predominantly compounds of the formula A1 (X=H) are used.

The total proportion of the compounds of the formulae 1 to 11 and A and B can easily be adjusted by those skilled in the art in a manner such that Δε is greater than or equal to +5. The mixtures preferably contain one or more compounds of the formulae 7 to 11.

The proportion of non-polar components of the formulae 12-20 and C and D is preferably 50 to 85%, in particular 55 to 75%, the proportion of the esters of the formulae 12-18 and C and D making up 50 to 70%, in particular 55 to 65%. At least 5 esters were (sic) preferably used. The mixtures preferably contain one or more compounds of the formula C and/or D.

Preferred mixtures contain compounds selected from the formulae 12-14 and compounds selected from the formulae 15-18. The proportion of tolans of the formulae 19 and 20 is preferably 10 to 30%, in particular 15 to 25%. At least three tolans are preferably used.

The construction of the liquid-crystal displays according to the invention from polarizers, electrode base plates and electrodes having a surface treatment such that the preferential orientation (director) of the liquid-crystal molecules which are adjacent in each case is usually twisted from one electrode to the next by an amount of 160° to 360°, corresponds to the customary construction for displays of this type. The term customary construction here is broad and also covers all derivations and modifications of the supertwist cell. The surface tilt angle at the two support plates can be identical or different. Identical tilt angles are preferred.

An essential difference of the displays according to the invention to those customary hitherto based on the twisted nematic cell is, however, the choice of liquid-crystal parameters of the liquid-crystal layer.

In the displays according to the invention, liquid-crystal phases are employed in which the liquid-crystal parameters $\Delta\epsilon$ and $\Delta\epsilon/\epsilon\perp$ are chosen so that a steepest possible electrooptical characteristic line is ensured, together with maximum contrast and mimimum dependency on the viewing angle at the same time as a nematic phase region of at least 60° and a viscosity of 30 mPa.s or less.

The liquid-crystal mixtures which can be used according to the invention are prepared in a manner which is customary per se. In general, the desired amount of the components used in a relatively small amount is dissolved in the components making up the principal constituent, expediently at elevated temperature. It is also possible to mix solutions of the components in an organic solvent, for example in acetone, chloroform or methanol, and, after thorough mixing, to remove the solvent again, for example in acetone, chloroform or methanol, and, after thorough mixing, to remove the solvent again, for example by distillation.

The dielectrics can also contain further additives which are known to those skilled in the art and described in the literature. For example, 0-15% of pleochroic dyes can be added.

The examples below are intended to illustrate the invention without representing a limitation.

The abbreviations have the following meanings:

| | |
|---|---|
| S-N | smectic-nematic phase transition temperature, |
| c.p. | clear point |
| visc. | viscosity at 20° (mPa.s) |
| $V_{50}/V_{10}$ | steepness of the characteristic line of a SLC display at 20°, d/p (layer thickness/pitch) ~ 0.35, d × $\Delta n$ = 1.06, twist angle 180°, pitch angle ~ 1°. |

All temperatures above and below are given in °C. The percentages are percent by weight.

EXAMPLE 1

A SLC display having the following parameters:

| | |
|---|---|
| twist angle | 180° |
| tilt angle | 1° |
| d/p (layer thickness/pitch) | 0.35 |
| d × $\Delta n$ | 1.06 | and containing a liquid-crystal mixture having the following parameters:

| | |
|---|---|
| clear point | 94.7° |
| $\Delta n$ | 0.1285 (589 nm) |
| | 0.1264 (633 nm) |
| viscosity | 20.9 mPa.s |
| $\Delta\epsilon$ | +5.5 |
| $\epsilon\perp$ | 5.0 | and comprising:
10% of p-trans-4-propylcyclohexylbenzonitrile,
8% of 2-p-cyanophenyl-5-propyl-1,3-dioxane,
7% of 2-p-cyanophenyl-5-butyl-1,3-dioxane,
6% of p-methoxyphenyl trans-4-propylcyclohexanecarboxylate,
6% of p-ethoxyphenyl trans-4-propylcyclohexanecarboxylate,
6% of p-methoxyphenyl trans-4-butylcyclohexanecarboxylate,
6% of p-ethoxyphenyl trans-4-butylcyclohexanecarboxylate,
6% of p-methoxyphenyl trans-4-pentylcyclohexanecarboxylate,
6% of p-ethoxyphenyl trans-4-pentylcyclohexanecarboxylate,
6% of p-propylphenyl trans-4-(trans-4-propylcyclohexyl)cyclohexanecarboxylate,
6% of p-pentylphenyl trans-4-(trans-4-propylcyclohexyl)cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
3% of 4-methyl-4'-ethoxytolan,
4% of 4-ethyl-4'-methoxytolan,
4% of 4-(trans-4-propylcyclohexyl)-4'-methoxytolan and
4% of 4-(trans-4-propylcyclohexyl)-4'-ethoxytolane
exhibits a characteristic line steepness $V_{50}/V_{10}$ of 3.8% at $V_{10}$=2.1 volts.

EXAMPLE 2

An SLC display having the following parameters:

| | |
|---|---|
| twist angle | 180° |
| tilt angle | 1° |
| d/p (layer thickness/pitch) | 0.35 |
| d × $\Delta n$ | 1.05 | and containing a liquid-crystal mixture having the following parameters:

| | |
|---|---|
| clear point | 96.3° |
| $\Delta n$ | 0.1196 (589 nm) |
| | 0.1177 (633 nm) |
| viscosity | 22.9 mPa.s |
| $\Delta\epsilon\perp$ | +5.5 | and comprising:
15% of p-trans-4-propylcyclohexylbenzonitrile,
10% of p-trans-4-ethylcyclohexylbenzonitrile,
8% of 4-ethyl-4'-cyanobiphenyl,
9% of 4-propyl-4'-cyanobiphenyl,
4% of p-methoxyphenyl trans-4-propylcyclohexanecarboxylate,
4% of p-ethoxyphenyl trans-4-propylcyclohexanecarboxylate,
4% of p-methoxyphenyl trans-4-butylcyclohexanecarboxylate,
4% of p-ethoxyphenyl trans-4-butylcyclohexanecarboxylate,
6% of p-propylphenyl trans-4-(trans-4-propylcyclohexyl)cyclohexanecarboxylate,
6% of p-pentylphenyl trans-4-(trans-4-propylcyclohexyl)cyclohexanecarboxylate,
6% of p-pentylphenyl trans-4-(trans-4-butylcyclohexyl)cyclohexanecarboxylate,
6% of p-propylphenyl trans-4-(trans-4-butylcyclohexyl)cyclohexanecarboxylate,
10% of p-trans-4-propylcyclohexylphenyl trans-4-butylcyclohexanecarboxylate, and 10% of p-trans-4-propylcyclohexyl trans-4-pentylcyclohexanecarboxylate, exhibits a characteristic line steepness $V_{50}/V_{10}$ of 4.8% at $V_{10}=1.8$ volts.

EXAMPLE 3

A liquid-crystal mixture comprising
15% of p-trans-4-propylcyclohexylbenzonitrile,
8% of 4-ethyl-4'-cyanobiphenyl,
7% of 4-propyl-4'-cyanobiphenyl,
8% of 4-butyl-4'-cyanobiphenyl,
5% of p-methoxyphenyl trans-4-propylcyclohexanecarboxylate,
4% of p-ethoxyphenyl trans-4-propylcyclohexanecarboxylate,
5% of p-methoxyphenyl trans-4-butylcyclohexanecarboxylate,
4% of p-ethoxyphenyl trans-4-butylcyclohexanecarboxylate,
4% of p-methoxyphenyl trans-4-pentylcyclohexanecarboxylate,
4% of p-ethoxyphenyl trans-4-pentylcyclohexanecarboxylate,
6% of p-propylphenyl trans-4-(trans-4-propylcyclohexyl)cyclohexanecarboxylate,
6% of p-pentylphenyl trans-4-(trans-4-propylcyclohexyl)cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
6% of p-trans-4-propylcyclohexylphenyl trans-4-butylcyclohexanecarboxylate, and
6% of p-trans-4-propylcyclohexylphenyl trans-4-pentylcyclohexanecarboxylate,
is characterized by the following parameters:

| clear point: | 96° |
|---|---|
| viscosity: | 21.7 mPa.s |
| $\Delta n$: | 0.126 |
| $\Delta\epsilon$: | 5.0 |
| $\epsilon\perp$: | 4.8 |

The mixture gives rise to excellent characteristic line steepnesses in SLC displays.

EXAMPLE 4

A liquid-crystal mixture comprising
5% of 2-p-cyanophenyl-5-ethyl-1,3-dioxane,
7% of 2-p-cyanophenyl-5-propyl-1,3-dioxane,
8% of 2-p-cyanophenyl-5-butyl-1,3-dioxane,
5% of trans-1-p-methoxyphenyl-4-propylcyclohexane,
20% of trans-4-propylcyclohexyl trans-4-propylcyclohexanecarboxylate,
10% of trans-4-pentylcyclohexyl trans-4-propylcyclohexanecarboxylate,
5% of p-trans-4-propylcyclohexylphenyl trans-4-butylcyclohexanecarboxylate,
5% of p-trans-4-propylcyclohexylphenyl trans-4-pentylcyclohexanecarboxylate,
5% of p-propylphenyl trans-4-(trans-4-propylcyclohexyl)cyclohexanecarboxylate,
5% of p-pentylphenyl trans-4-(trans-4-propylcyclohexyl)cyclohexanecarboxylate,
5% of p-propylphenyl trans-4-(trans-4-butylcyclohexyl)-cyclohexanecarboxylate,
5% of p-pentylphenyl trans-4-(trans-4-butylcyclohexyl)-cyclohexanecarboxylate,
3% of 4-methyl-4'-ethoxytolan,
3% of 4-ethyl-4'-methoxytolan,
3% of 4-(trans-4-propylcyclohexyl)-4'-methoxytolan,
3% of 4-(trans-4-propylcyclohexyl)-4'-ethoxytolan and
3% of 4-(trans-4-propylcyclohexyl)-4'-propoxytolan
is distinguished by the following parameters:

| clear point: | 87.9° |
|---|---|
| viscosity: | 23.4 mPa.s (20°) |
| | 1097 mPa.s (−30°) |
| $\Delta n$: | 0.1093 (589 nm) |
| $\Delta\epsilon$: | 4.9 |
| $\epsilon\perp$: | 4.8 |
| $K_3/K_1$: | 1.15 |

This mixture gives rise to excellent characteristic line steepnesses in SLC displays of the OMI type:

| twist angle: | 180° |
|---|---|
| d × $\Delta n$: | 0.5 |
| d/p: | 0.35 |
| $V_{50}/V_{10}$: | 5.4% |

EXAMPLE 5

A liquid-crystal mixture comprising
15% of 1-(p-cyanophenyl)-2-(trans-4-propylcyclohexyl)-ethane,
8% of 4-ethyl-4'-cyanobiphenyl,
7% of 4-propyl-4'-cyanobiphenyl,
8% of 2-(p-cyanophenyl)-5-pentylpyridine,
5% of p-methoxyphenyl trans-4-propylcyclohexanecarboxylate,
4% of p-ethoxyphenyl trans-4-propylcyclohexanecarboxylate,
5% of p-methoxyphenyl trans-4-butylcyclohexanecarboxylate,
4% of p-ethoxyphenyl trans-4-butylcyclohexanecarboxylate,
4% of p-methoxyphenyl trans-4-pentylcyclohexanecarboxylate,
4% of p-ethoxyphenyl trans-4-pentylcyclohexanecarboxylate,
6% of p-propylphenyl trans-4-(trans-4-propylcyclohexyl)cyclohexanecarboxylate,
6% of p-pentylphenyl trans-4-(trans-4-propylcyclohexyl)cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
6% of p-trans-4-propylcyclohexylphenyl trans-4-butylcyclohexanecarboxylate and
6% of p-trans-4-propylcyclohexylphenyl trans-4-pentylcyclohexanecarboxylate
is distinguished by excellent characteristic line steepnesses in SLC displays.

EXAMPLE 6

A liquid-crystal mixture comprising
5% of 3-fluoro-4-cyanophenyl p-pentylbenzoate,
7% of 2-p-cyanophenyl-5-propyl-1,3-dioxane,
8% of 2-p-cyanophenyl-5-butyl-1,3-dioxane,
5% of trans-1-p-fluorophenyl-4-propylcyclohexane, 20% of trans-4-propylcyclohexyl trans-4-propylcyclohexanecarboxylate,
10% of 2-methylpyridin-5-yl trans-4-propylcyclohexanecarboxylate,
5% of p-trans-4-propylcyclohexylphenyl trans-4-butylcyclohexanecarboxylate,
5% of p-trans-4-propylcyclohexylphenyl trans-4-pentylcyclohexanecarboxylate,
5% of p-fluorophenyl trans-4-(trans-4-propylcyclohexyl)cyclohexanecarboxylate,
5% of p-pentylphenyl trans-4-(trans-4-propylcyclohexyl)cyclohexanecarboxylate,
5% of p-propylphenyl trans-4-(trans-4-butylcyclohexyl)-cyclohexanecarboxylate,
5% of p-pentylphenyl trans-4-(trans-4-butylcyclohexyl)-cyclohexanecarboxylate,
3% of 4-methyl-4'-ethoxytolan,
3% of 4-ethyl-4'-methoxytolan,
3% of 4-(trans-4-propylcyclohexyl)-4'-methoxytolan,
3% of 4-(trans-4-propylcyclohexyl)-4'-ethoxytolan and
3% of 4-(trans-4-propylcyclohexyl)-4'-propoxytolan
gives rise to excellent characteristic line steepnesses in SLC displays.

EXAMPLE 7

A liquid-crystal mixture comprising
15% of p-trans-4-propylcyclohexylbenzonitrile,
8% of 2-(3-fluoro-4-cyanophenyl)-5-pentylpyrimidine,
7% of 4-propyl-4'-cyanobiphenyl,
8% of 4-butyl-4'-cyanobiphenyl,
5% of p-methoxyphenyl trans-4-propylcyclohexanecarboxylate,
4% of p-ethoxyphenyl trans-4-propylcyclohexanecarboxylate,
5% of p-methoxyphenyl trans-4-butylcyclohexanecarboxylate,
4% of p-ethoxyphenyl trans-4-butylcyclohexanecarboxylate,
4% of p-methoxyphenyl trans-4-pentylcyclohexanecarboxylate,
4% of p-ethoxyphenyl trans-4-pentylcyclohexanecarboxylate,
6% of p-propylphenyl trans-4-(trans-4-propylcyclohexyl)cyclohexanecarboxylate,
6% of p-pentylphenyl trans-4-(trans-4-propylcyclohexyl)cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
6% of p-trans-4-propylcyclohexylphenyl trans-4-butylcyclohexanecarboxylate and
6% of p-trans-4-propylcyclohexylphenyl trans-4-pentylcyclohexanecarboxylate
is distinguished by excellent characteristic line steepnesses in SLC displays.

EXAMPLE 8

A liquid-crystal mixture comprising
5% of 1-[trans-4-(p-cyanophenyl)cyclohexyl]-2-(trans-4-pentylcyclohexyl)ethane,
5% of 2-p-cyanophenyl-5-propyl-1,3-dioxane,
5% of 2-p-cyanophenyl-5-butyl-1,3-dioxane,
5% of 1-(3,4-difluorophenyl)-2-[trans-4-(trans-4-propylcyclohexyl)cyclohexyl]ethane (sic),
5% of trans-1-p-methoxyphenyl-4-propylcyclohexane,
20% of trans-4-propylcyclohexyl trans-4-propylcyclohexanecarboxylate,
10% of trans-4-pentylcyclohexyl trans-4-propylcyclohexanecarboxylate,
5% of p-trans-4-propylcyclohexylphenyl trans-4-butylcyclohexanecarboxylate,
5% of p-trans-4-propylcyclohexylphenyl trans-4-pentylcyclohexanecarboxylate,
5% of p-propylphenyl trans-4-(trans-4-propylcyclohexyl)cyclohexanecarboxylate,
5% of p-pentylphenyl trans-4-(trans-4-propylcyclohexyl)cyclohexanecarboxylate,
5% of p-propylphenyl trans-4-(trans-4-butylcyclohexyl)-cyclohexanecarboxylate,
5% of p-pentylphenyl trans-4-(trans-4-butylcyclohexyl)-cyclohexanecarboxylate,
3% of 4-methyl-4'-ethoxytolan,
3% of 4-ethyl-4'-methoxytolan,
3% of 4-(trans-4-propylcyclohexyl)-4'-methoxytolan,
3% of 4-(trans-4-propylcyclohexyl)-4'-ethoxytolan and
3% of 4-(trans-4-propylcyclohexyl)-4'-propoxytolan
is distinguished by excellent characteristic line steepnesses in SLC displays.

EXAMPLE 9

A liquid-crystal mixture comprising
7% of 2-fluoro-4-[trans-4-(trans-4-propylcyclohexyl)cyclohexyl)benzonitrile (sic),
8% of p-trans-4-propylcyclohexylbenzonitrile,
8% of 4-ethyl-4'-cyanobiphenyl,
7% of 4-propyl-4'-cyanobiphenyl,
8% of 1,2-difluoro-4-[trans-4-(trans-4-propylcyclohexyl)cyclohexyl]benzene,
5% of p-methoxyphenyl trans-4-propylcyclohexanecarboxylate,
4% of p-ethoxyphenyl trans-4-propylcyclohexanecarboxylate,
5% of p-methoxyphenyl trans-4-butylcyclohexanecarboxylate,
4% of p-ethoxyphenyl trans-4-butylcyclohexanecarboxylate,
4% of p-methoxyphenyl trans-4-pentylcyclohexanecarboxylate,
4% of p-ethoxyphenyl trans-4-pentylcyclohexanecarboxylate,
6% of p-propylphenyl trans-4-(trans-4-propylcyclohexyl)cyclohexanecarboxylate,
6% of p-pentylphenyl trans-4-(trans-4-propylcyclohexyl)cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
6% of p-trans-4-propylcyclohexylphenyl trans-4-butylcyclohexanecarboxylate and
6% of p-trans-4-propylcyclohexylphenyl trans-4-pentylcyclohexanecarboxylate
is distinguished by excellent characteristic line steepnesses in SLC displays.

EXAMPLE 10

A liquid-crystal mixture comprising
5% of 1-(3,4-difluorophenyl)-2-[p-(trans-4-propylcyclohexyl)phenyl]ethane,
7% of 2-p-cyanophenyl-5-propyl-1,3-dioxane,
8% of 2-p-cyanophenyl-5-butyl-1,3-dioxane,
5% of trans-1-p-methoxyphenyl-4-propylcyclohexane,
20% of trans-4-propylcyclohexyl trans-4-propylcyclohexanecarboxylate, 10% of trans-4-pentylcyclohexyl trans-4-propylcyclohexanecarboxylate,
5% of p-trans-4-propylcyclohexylphenyl trans-4-butylcyclohexanecarboxylate,
5% of p-trans-4-propylcyclohexylphenyl trans-4-pentylcyclohexanecarboxylate,
5% of p-propylphenyl trans-4-(trans-4-propylcyclohexyl)cyclohexanecarboxylate,
5% of p-pentylphenyl trans-4-(trans-4-propylcyclohexyl)cyclohexanecarboxylate,
5% of p-propylphenyl trans-4-(trans-4-butylcyclohexyl)-cyclohexanecarboxylate,
5% of p-pentylphenyl trans-4-(trans-4-butylcyclohexyl)cyclohexanecarboxylate,
3% of 4-methyl-4'-ethoxytolan,
3% of 4-ethyl-4'-methoxytolan,
3% of 4-(trans-4-propylcyclohexyl)-4'-methoxytolan,
3% of 4-(trans-4-propylcyclohexyl)-4'-ethoxytolan and
3% of 4-(trans-4-propylcyclohexyl)-4'-propoxytolan
is distinguished by excellent characteristic line steepnesses in SLC displays.

The chiral dope used in the mixtures above was in each case S-811 [2-octyl p-(p-n-hexylbenzoyloxyphenyl)benzoate].

We claim:

1. A supertwist liquid crystal display having
two planoparallel support plates which, together with a border, form a cell,
a nematic liquid-crystal mixture which is located in the cell, has positive dielectric anisotropy and has at least one chiral dope,
electrode layers with overlying orientation layers on the insides of the support plates,
a tilt angle between the longitudinal axis of the molecules at the surface of the support plates and the support plates of from about 1 degree to 30 degrees, and
a twist angle of the liquid-crystal mixture in the cell of between 160° and 360° from orientation layer to orientation layer, characterized in that the nematic liquid-crystal mixture satisfies the following conditions:
a nematic phase range of at least 60° C.,
a viscosity of 30 mPa.s or less,
$\Delta\epsilon/\epsilon_\perp < 1.5$, where $\Delta\epsilon$ denotes the dielectric anisotropy and $\epsilon_\perp$ denotes the dielectric constant in the direction of the short axis of the liquid-crystal molecules, and
$\Delta\epsilon$ is greater than or equal to $+5$,
wherein the nematic liquid-crystal mixture comprises at least one component of the formulae 6, 7, 8, 9, 10 or 11, as follows:

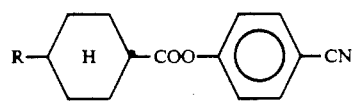

6

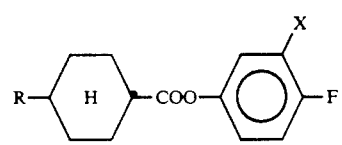

7

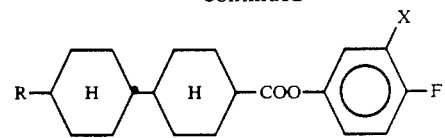

8

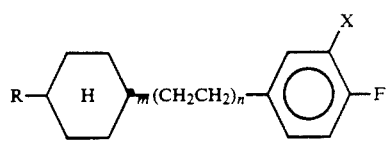

9

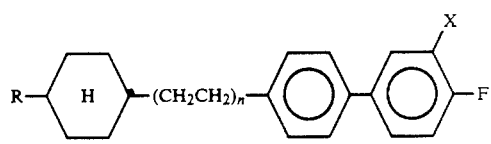

10 or

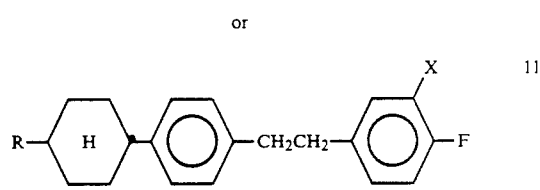

11 and is based on components (a) and (b):

wherein component (a) comprises compounds having a high $\epsilon_\perp$ and a clearly positive dielectric constant, selected from the group comprising compounds of formulae 1-5, A, and B:

1

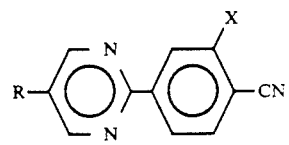

2

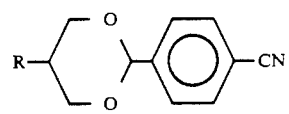

3

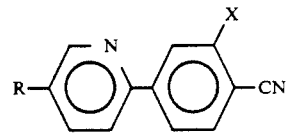

4

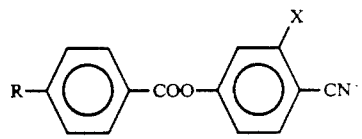

5

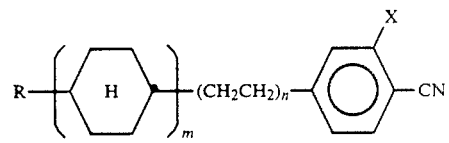

A

-continued

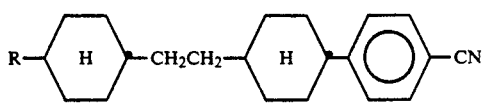
B and
component (b) comprises relatively non-polar compounds having a large $\epsilon_\perp$ selected from the group comprising compounds of formulae 12-18, C and D:

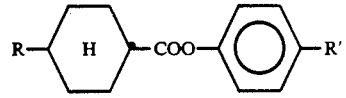
12

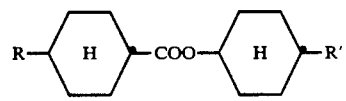
13

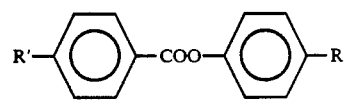
14

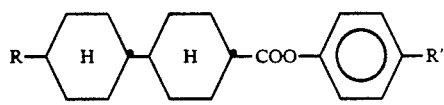
15

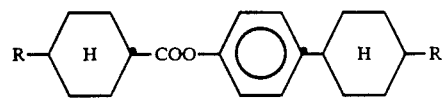
16

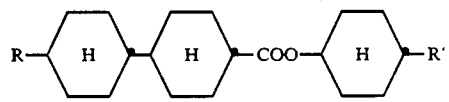
17

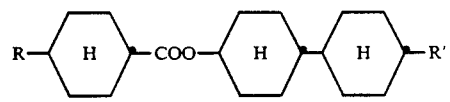
18

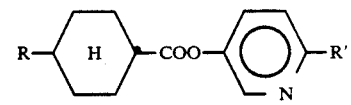
C

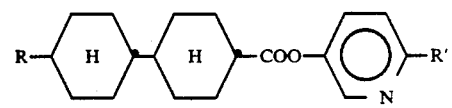
D and optionally compounds having a high birefringence and a structure of formulae 19 or 20:

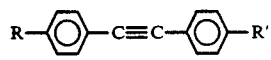
19

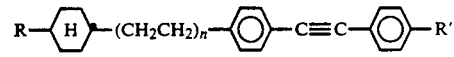
20 where X is H or F, m is 1 or 2, n is 0 or 1, and R is in each case alkyl, oxaalkyl or alkenyl having 2 to 7 C atoms, each of which is straight-chain, and R' is alkyl or alkoxy, each of which has 1 to 7 C atoms and each of which is straight-chain.

2. A supertwist liquid crystal display having
two planoparallel support plates which, together with a border, form a cell,
a nematic liquid-crystal mixture which is located in the cell, has positive dielectric anisotropy and has at least one chiral dope,
electrode layers with overlying orientation layers on the insides of the support plates,
a tilt angle between the longitudinal axis of the molecules at the surface of the support plates and the support plates of from about 1 degree to 30 degrees, and
a twist angle of the liquid-crystal mixture in the cell of between 160° and 360° from orientation layer to orientation layer, characterized in that the nematic liquid-crystal mixture satisfies the following conditions:
a nematic phase range of at least 60° C.,
a viscosity of 30 mPa.s or less,
$\Delta\epsilon/\epsilon_\perp < 1.5$, where $\Delta\epsilon$ denotes the dielectric anisotropy and $\epsilon_\perp$ denotes the dielectric constant in the direction of the short axis of the liquid-crystal molecules, and
$\Delta\epsilon$ is greater than or equal to +5,
wherein the nematic liquid-crystal mixture comprises at least one tolan compound of the formula 19 or 20, as follows:

19

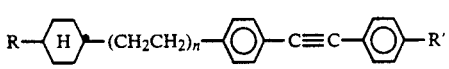
20 and is based on components (a) and (b):
wherein component (a) comprises compounds having a high $\epsilon_\perp$ and a clearly positive dielectric constant, selected from the group comprising compounds of formulae 1-11, A, and B:

1

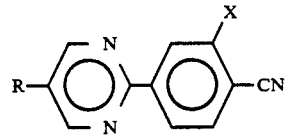
2

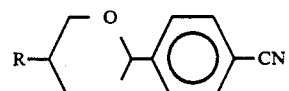
3

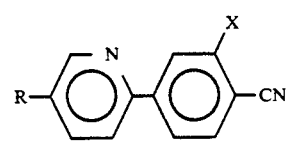
4

-continued

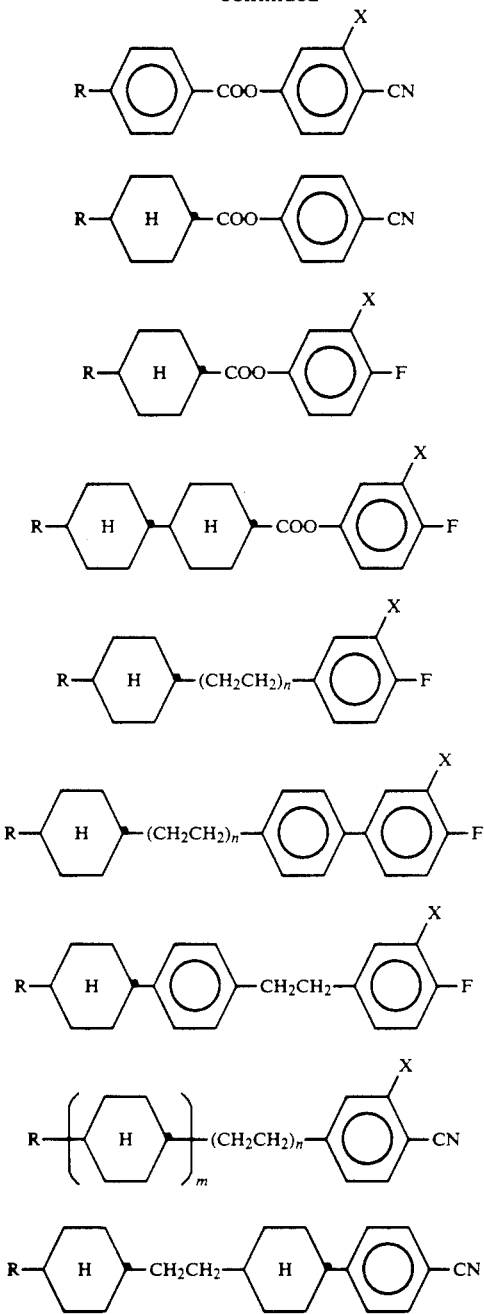

and
component (b) comprises relatively non-polar compounds having a large $\epsilon\perp$ selected from the group comprising compounds of formulae 12-18, C and D:

-continued

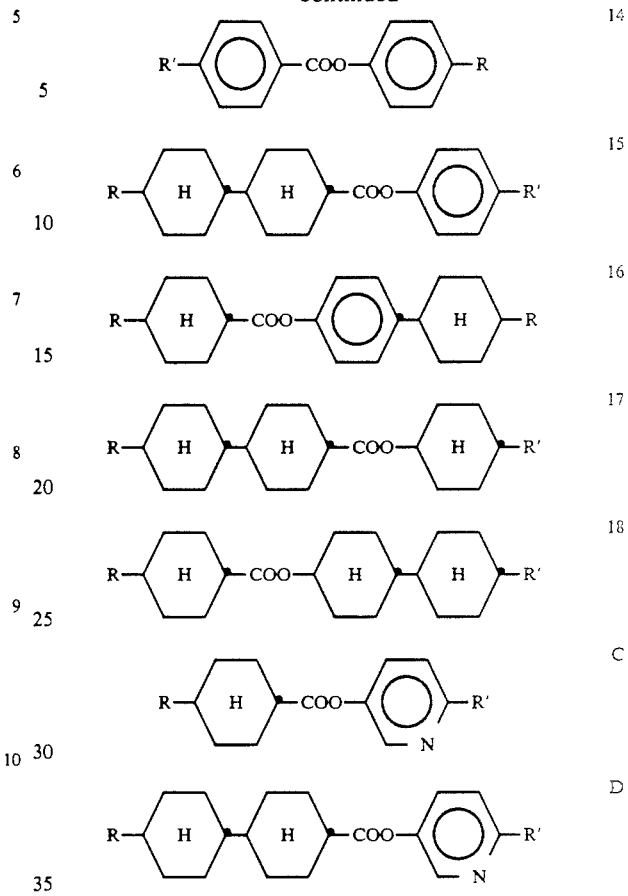

where X is H or F, m is 1 or 2, n is 0 or 1, and R is in each case alkyl, oxaalkyl or alkenyl having 2 to 7 C atoms, each of which is straight-chain, and R' is alkyl or alkoxy, each of which has 1 to 7 C atoms and each of which is straight-chain.

3. A supertwist liquid crystal display having
two planoparallel support plates which, together with a border, form a cell,
a nematic liquid-crystal mixture which is located in the cell, has positive dielectric anisotropy and has at least one chiral dope,
electrode layers with overlying orientation layers on the insides of the support plates,
a tilt angle between the longitudinal axis of the molecules at the surface of the support plates and the support plates of from about 1 degree to 30 degrees, and
a twist angle of the liquid-crystal mixture in the cell of between 160° and 360° from orientation layer to orientation layer, characterized in that the nematic liquid-crystal mixture satisfies the following conditions:
a nematic phase range of at least 60° C.,
a viscosity of 30 mPa.s or less,
$\Delta\epsilon/\epsilon\perp < 1.5$, where $\Delta\epsilon$ denotes the dielectric anisotropy and $\epsilon\perp$ denotes the dielectric constant in the direction of the short axis of the liquid-crystal molecules, and
$\Delta\epsilon$ is greater than or equal to +5,
wherein the nematic liquid-crystal mixture comprises compounds selected from the formulae 12-14, as follows:

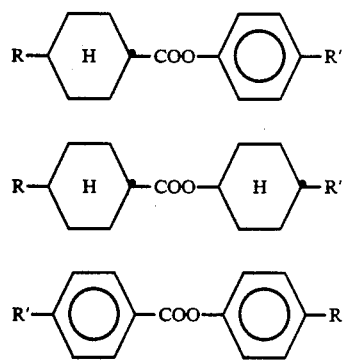

and compounds selected from the formulae 15-18, as follows:

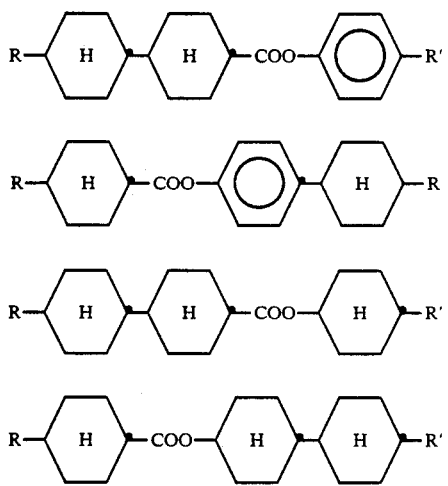

and is based on components (a) and (b):
wherein component (a) comprises compounds having a high $\epsilon\perp$ and a clearly positive dielectric constant, selected from the group comprising compounds of formulae 1-11, A, and B:

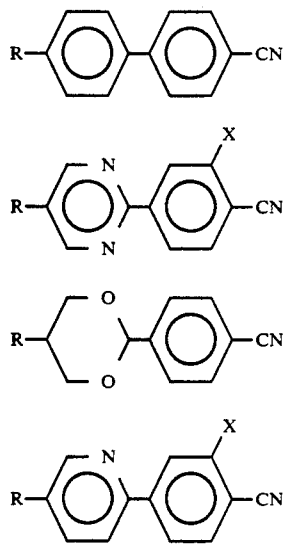

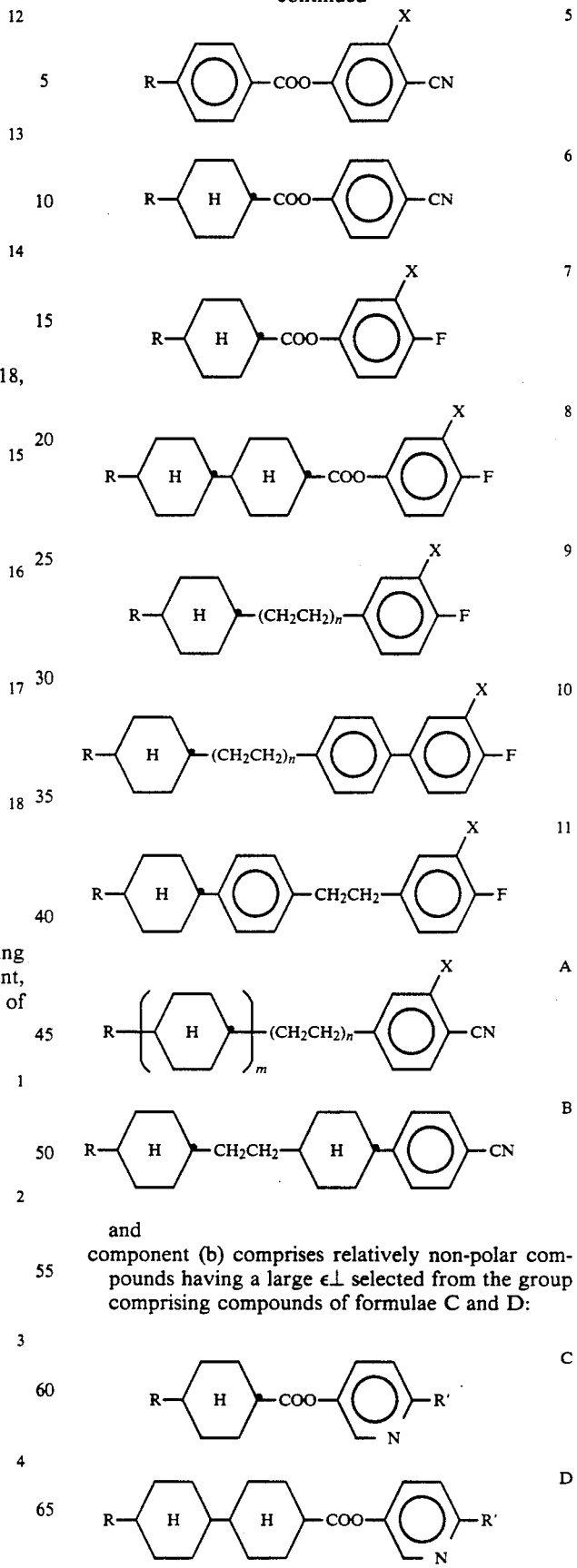

and
component (b) comprises relatively non-polar compounds having a large $\epsilon\perp$ selected from the group comprising compounds of formulae C and D:

and optionally compounds having a high birefringence and a structure of formulae 19 or 20:

19

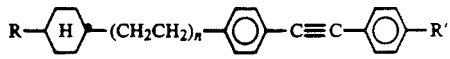
20 where X is H or F, m is 1 or 2, n is 0 or 1, and R is in each case alkyl, oxaalkyl or alkenyl having 2 to 7 C atoms, each of which is straight-chain, and R' is alkyl or alkoxy, each of which has 1 to 7 C atoms and each of which is straight-chain.

4. A display according to claim 2, wherein the nematic liquid-crystal mixture contains 10 to 30% of tolans of the formulae 19 and 20.

* * * * *